United States Patent [19]

Adachi

[11] Patent Number: 5,777,980
[45] Date of Patent: Jul. 7, 1998

[54] OPTICAL DISK RECORDING APPARATUS CAPABLE OF REDUCING CROSS-TALK BETWEEN PRE-PITS AND ADJACENT TRACKS

[75] Inventor: Tadashi Adachi, Tokyo, Japan

[73] Assignee: NEC Corporation, Japan

[21] Appl. No.: 651,272

[22] Filed: May 23, 1996

[30] Foreign Application Priority Data

May 23, 1995 [JP] Japan ................... 7-123518

[51] Int. Cl.⁶ .................. G11B 7/24; G11B 9/00
[52] U.S. Cl. ........................ 364/275.4; 369/124
[58] Field of Search ................ 369/275.4, 116, 369/84, 14, 124, 275.2; 430/320, 321

[56] References Cited

U.S. PATENT DOCUMENTS

| | | | |
|---|---|---|---|
| 5,581,531 | 12/1996 | Ito et al. | 369/100 |
| 5,616,390 | 4/1997 | Miyagawa et al. | 369/275.4 |
| 5,652,747 | 7/1997 | Schiawa | 369/275.4 |
| 5,680,381 | 10/1997 | Horimai | 369/124 |

FOREIGN PATENT DOCUMENTS 1-286122  11/1989  Japan .

Primary Examiner—Tan Dinh
Attorney, Agent, or Firm—Hayes, Soloway, Hennessey, Grossman & Hage, P.C.

[57] ABSTRACT

An apparatus for optical master disk exposure for exposing guide grooves and pre-pits with laser beams has a reference signal generator which generates a reference signal for being supplied to a groove reference voltage generator that generates a groove reference voltage according to the reference signal. A pre-pit designation signal generator generates a pre-pit designation signal designating formation of the pre-pits. A pre-pit region voltage generator generates a pre-pit region voltage with a power of level of 70 to 75% of the groove reference voltage according to the pre-pit designation signal. A bias voltage generator generates a bias voltage with a power level of 80 to 90 of the groove reference voltage when no pre-pit is formed according to the pre-pit designation signal. A guide groove exposure voltage supplier adds together the groove reference voltage, the pre-pit region voltage and the bias voltage and outputs a guide groove exposure voltage to a laser beam modulating means which modulates the laser beams according to the guide groove exposure voltage received from the guide groove exposure voltage supplier. The guide grooves are uniformly formed thereby enabling the reduction of cross-talk.

7 Claims, 4 Drawing Sheets

PRE-PIT WRITING REGION

OPTICAL DISK RECORDING APPARATUS CAPABLE OF REDUCING CROSS-TALK BETWEEN PRE-PITS AND ADJACENT TRACKS

BACKGROUND OF THE INVENTION (1) Field of the Invention

The present invention relates to an apparatus and a method for exposing an optical master disk used for producing optical disks, and more particularly to such an apparatus and a method for use in producing an optical disk in which signal quality is high and cross-talk to tracks adjacent to pre-pits are reduced.

(2) Description of the Related Art

Optical disks with which data can be written, erased and read using a laser beam have excellent features as a high capacity memory device because of its high recording density, so that the application thereof is being widely researched and developed in fields of such memory devices as for code data and image data.

With recording density increase of such optical disks, data formats of LTF (Logical Track Format) method, zone CAV (Constant Angular Velocity) method, etc., in which the linear-recording-density is made uniform over the disk surface, have been adopted and used as ISO formats of 5.25-inch and 3.5-inch optical disks.

In these data formats, pre-pits are not all oriented in a particular central angle direction in the disk surface.

In an exposure apparatus for an optical master disk which has concentric or spiral guide grooves and in which such data as address data are recorded as pre-pits in a region formed between two concentric or spiral guide grooves, the guide grooves and the pre-pits are exposed by using different laser beams. In another well-known technique, the power of the laser beam used for the guide groove exposure is set to different levels for guide grooves adjacent to pre-pits and those not adjacent to pre-pits. By so doing, the guide grooves adjacent to pre-pits and those not adjacent to pre-pits are made uniform in their shape, thus improving the groove signal quality.

From the optical master disk which has been exposed in the above way, a stamper used to form optical disks is produced through steps such as development, electro-casting and polishing.

The optical disks which are obtained in the above way are already at a practical application level in code data file memory fields and, also for still image and movie image data fields. In these days of multi-media development, the application of the optical disks is expected to be further expanded and diversified.

With the increase in the application of these optical disks, recording density improvement or further operation speed increase is expected through, for example, a reduction in inter-guide groove interval.

Japanese Patent Application Kokai Publication No. Hei 1-286122, for example, discloses a method of optical master disk exposure.

FIG. 1 is an operational waveform diagram concerning a laser beam used to expose guide grooves and pre-pits in a prior art optical master disk exposure method.

In this prior art optical master disk exposure method, the power G of the guide groove exposure laser beam 601, shown in FIG. 1, is modulated in synchronization with the power H of the pre-pit exposure laser beam 602 in FIG. 1.

In this prior art optical master disk exposure method, the exposure power G of the tracking guide groove exposure laser beam is reduced to 75% of the power of the laser beam for exposing normal guide grooves not adjacent to pre-pits.

In the above prior art optical master disk exposure method, with the above structure, the exposure power of the laser beam for exposing guide grooves adjacent to pre-pits, is set to be lower than the exposure power for exposing guide grooves not adjacent to pre-pits as described above, whereby the guide grooves adjacent to the pre-pits are made to be less deep than the guide grooves not adjacent to pre-pits. In this way, film reduction that may occur in portions on the opposite sides of pre-pits is prevented so as to make the pre-pit shape uniform, thus achieving stable electric characteristics obtained from the pre-pits.

When a stamper produced by using an optical master disk produced by the above prior art exposure method is used to produce an optical disk medium having a data format in which pre-pits are not all oriented in a particular central angle direction as in the LTF method and zone CAV method, the pre-pits and guide grooves adjacent thereto are exposed with laser beams having Gaussian distributions. Therefore, the laser beam for exposing the pre-pits and the laser beam for exposing the guide grooves partly overlap each other. This leads to a problem that a portion of guide groove that is adjacent to a pre-pit is different in shape from a guide groove portion not adjacent to the pre-pit.

A further problem in the prior art apparatus and method for optical master disk exposure is that, since the change in the shape of the guide grooves adjacent to the pre-pits increases the cross-talk which is caused by the leakage of adjacent track pre-pit signals into regions where no pre-pits are ordinarily present, the recorded data signal quality is deteriorated.

Specifically, in the prior art optical master disk exposure method, the region in which the guide grooves 9 are adjacent to pre-pits 10, is expanded toward a track side with pre-pits, as shown in FIG. 2. As a result, the laser beam used during playback passes through a region closer to the track with pre-pits, thus increasing the cross-talk from the adjacent track 8.

SUMMARY OF THE INVENTION

An object of the present invention, therefore, is to overcome the problems existing in the prior art, and to provide an apparatus and a method for optical master disk exposure used for an optical disk mastering process, which permit formation of uniform guide grooves in the disk surface, reduction of cross-talk to adjacent tracks by pre-pits, and improvement of signal quality of reproduced signal.

According to one aspect of the invention, there is provided an apparatus for optical master disk exposure for exposing guide grooves and pre-pits with laser beams, comprising:

- a reference signal generator for generating a reference signal designating a region constituted by sole guide grooves with the pre-pits not adjacent thereto;
- a groove reference voltage generator for generating a groove reference voltage according to the reference signal;
- a pre-pit designation signal generator for generating a pre-pit designation signal designating formation of the pre-pits;
- a pre-pit region voltage generator for generating a pre-pit region voltage according to the pre-pit designation signal;

a bias voltage generator for generating a bias voltage during a period in which no pre-pit is formed according to the pre-pit designation signal; and a guide groove exposure voltage supplier for adding together the groove reference voltage, the pre-pit region voltage and the bias voltage, and outputting a guide groove exposure voltage; and a laser beam modulating means for modulating the laser beams according to the guide groove exposure voltage received from the guide groove exposure voltage supplier.

The laser beam modulating means is constituted by a modulator using an acousto-optic element (A. O. modulator) or a modulator using an electro-optic crystal (E. O. modulator).

The method of optical master disk exposure according to the invention is featured in that at least three different output power levels are provided by power modulation of power levels in the guide groove exposure voltage supplier as a first power level for exposing guide grooves adjacent to a region sandwiched between two pre-pits adjacent to each other in the circumferential direction in a pre-pit region of the common sector, a second power level for exposing the guide grooves adjacent to the pre-pits, and a third power level for exposing guide grooves outside the pre-pit region.

In the above method, the first power level is made 80 to 90% of the third power level for exposing guide grooves outside the pre-pit region, and the second power level is 70 to 75% of the third power level for exposing guide grooves outside the pre-pit region.

BRIEF DESCRIPTION OF THE DRAWINGS

The above and other objects, features and advantages of the present invention will be apparent from the following description of preferred embodiment of the invention explained with reference to the accompanying drawings, in which.

PREFERRED EMBODIMENT OF THE INVENTION

Now, a preferred embodiment of the invention is explained with reference to the drawings.

Figure 1:
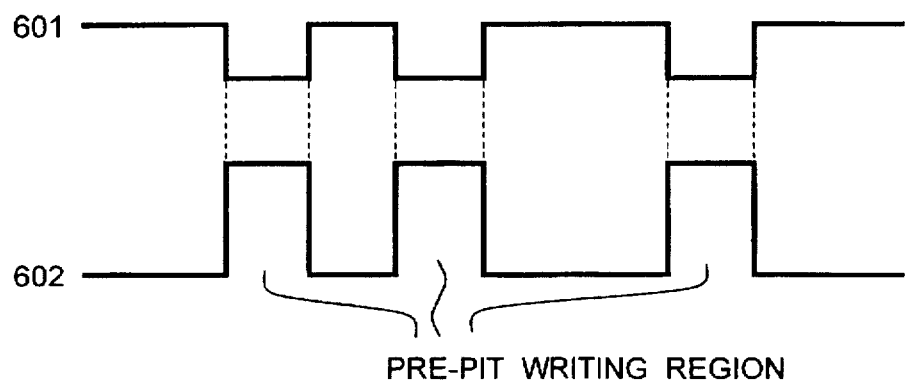
FIG. 1 is a waveform diagram showing exposure pulses for exposing pre-pits and grooves with a typical prior art optical master disk exposure apparatus.
Figure 2:
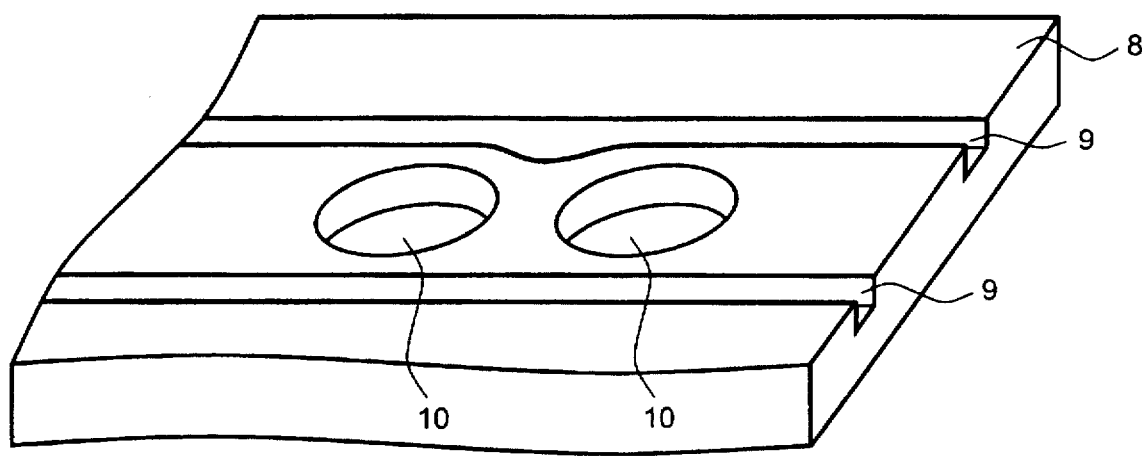
FIG. 2 is a view showing a model of the shape of guide grooves adjacent to pre-pits of an optical disk stamper produced in a prior art exposure method.
Figure 3:
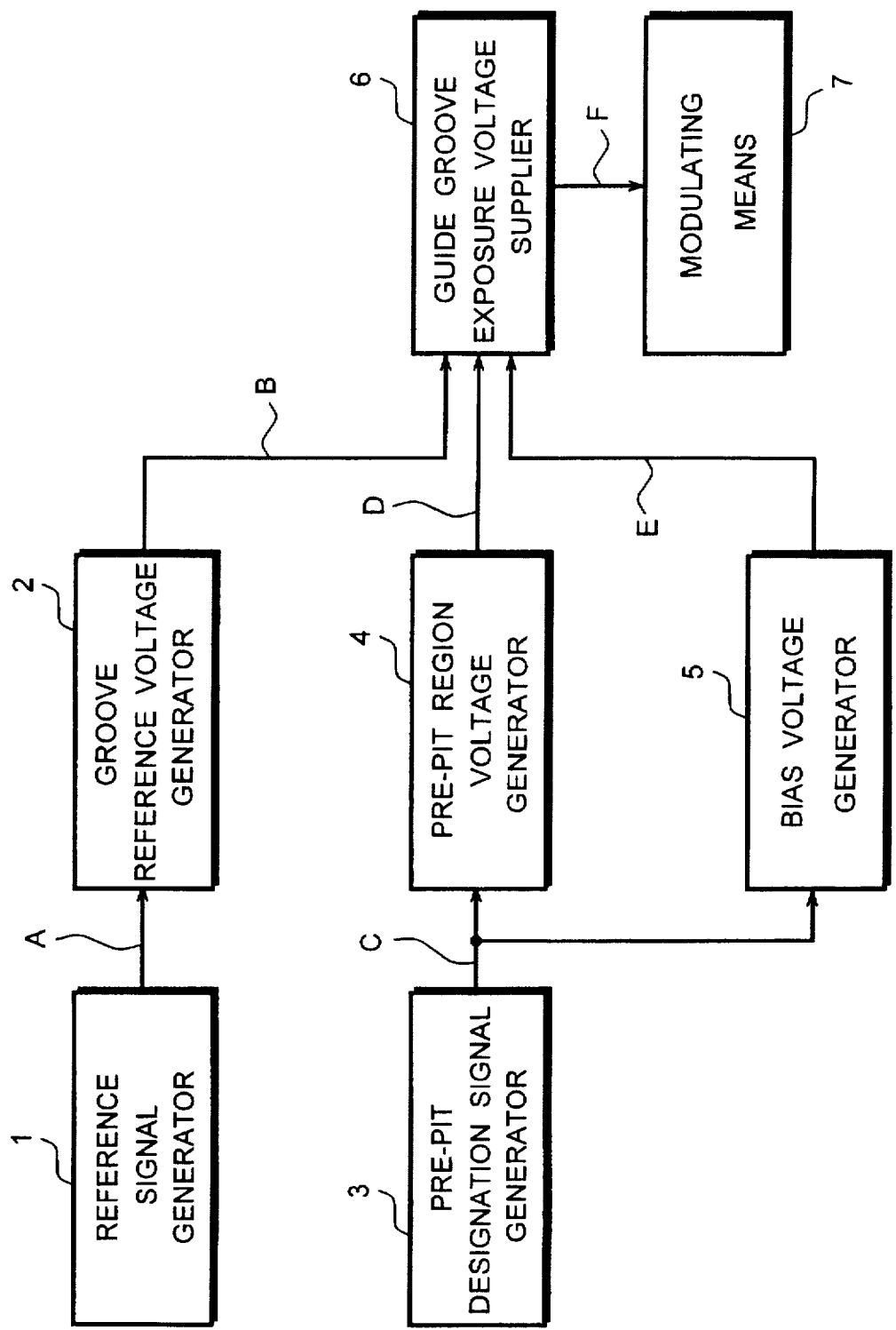
FIG. 3 is a block diagram showing an embodiment of the optical master disk exposure apparatus according to the invention.

FIG. 3 shows, in a block diagram, an optical master disk exposure apparatus as a first example of an embodiment according to the invention.

The illustrated embodiment of the optical master disk exposure apparatus comprises a guide groove exposure control circuit including a reference signal generator 1, a groove reference voltage generator 2, a pre-pit designation signal generator 3, a pre-pit region voltage generator 4, a bias voltage generator 5, a guide groove exposure voltage supplier 6 and a modulating means 7.

The operation of various parts of the guide groove exposure control circuit shown in FIG. 3 will now be described with reference to FIG. 4.

Figure 4:
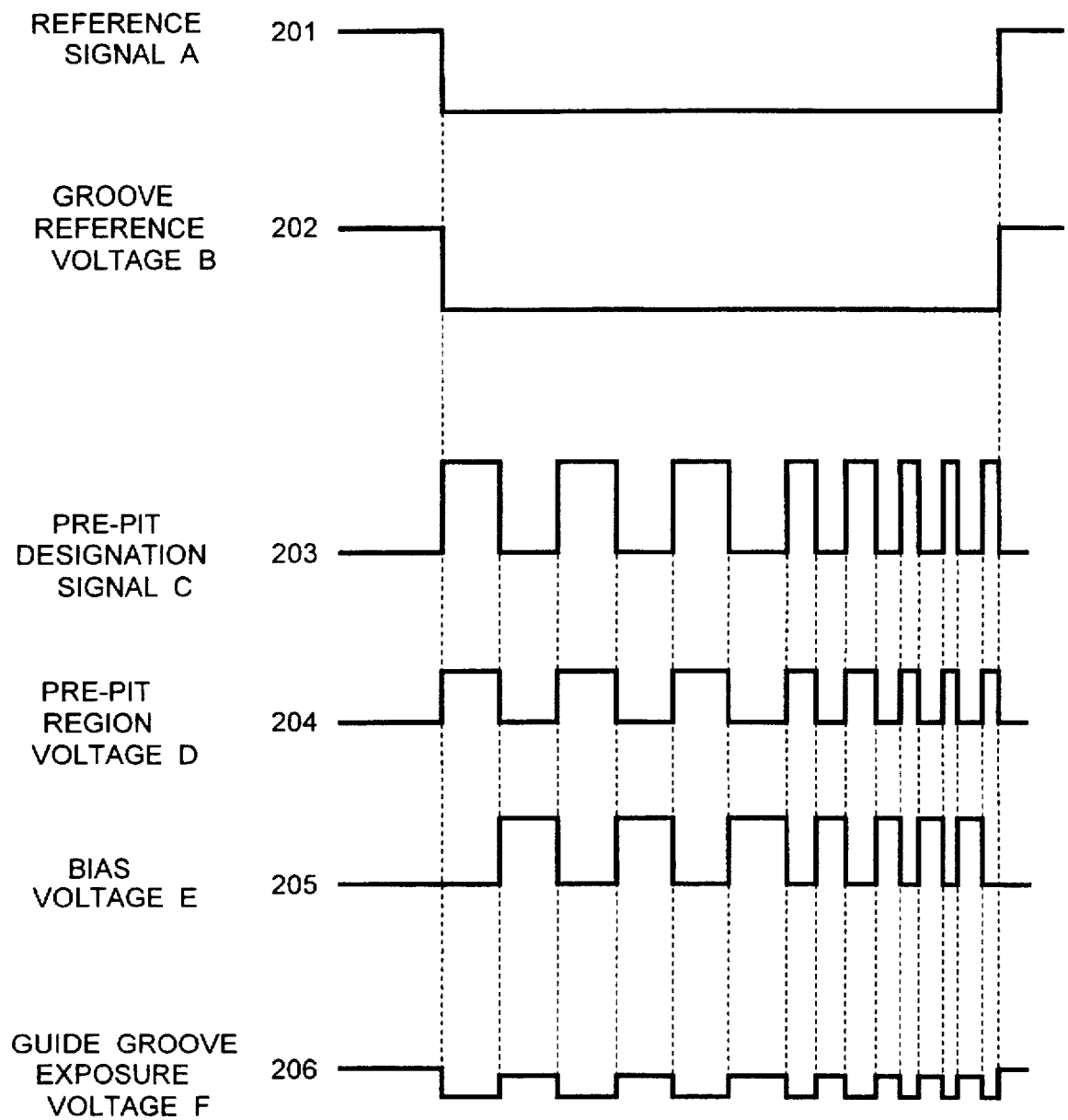
FIG. 4 is a waveform diagram showing waveforms appearing in various parts of a guide groove exposure control circuit in the optical master disk exposure apparatus shown in FIG. 3.

FIG. 4 shows waveforms appearing in various parts of the guide groove exposure control circuit in the optical master disk exposure apparatus shown in FIG. 3.

The reference signal generator 1 generates a reference signal A shown at 201 in FIG. 4 to be supplied to the groove reference voltage generator 2 for regions other than pre-pit regions, i.e., regions with only grooves with no pit train in pre-format.

The groove reference voltage generator 2 generates a groove reference voltage B shown at 202 in FIG. 4 to be supplied to the guide groove exposure voltage supplier 6 according to the reference signal A.

The pre-pit designation signal generator 3 generates a pre-pit designation signal C shown at 203 in FIG. 4.

The pre-pit region voltage generator 4 generates a pre-pit region voltage D shown at 204 in FIG. 4 to be supplied to the guide groove exposure voltage supplier 6 according to the pre-pit designation signal C.

The bias voltage generator 5 generates a bias voltage E shown at 205 in FIG. 4 to be supplied to the guide groove exposure voltage supplier 6 during a period in which no pre-pit is formed according to the pre-pit designation signal C.

The guide groove exposure voltage supplier 6 supplies a guide groove exposure voltage F shown at 206 in FIG. 4, obtained by adding together the groove reference voltage B from the groove reference voltage generator 2, the pre-pit region voltage D from the pre-pit region voltage generator 4, and the bias voltage E from the bias voltage generator 5, to the modulating means 7 for modulating the laser beam for guide groove exposure. The modulating means 7 thus outputs the guide groove exposure laser beam at three different power levels. The three different output power levels provided by power modulation of laser beams in the guide groove exposure voltage supplier are a first power level for exposing guide grooves adjacent to a region sandwiched between two pre-pits adjacent to each other in the circumferential direction in a pre-pit region of a common sector, a second power level for exposing the guide grooves adjacent to the pre-pits, and a third power level for exposing guide grooves outside the pre-pit region.

In the first example, the modulating means 7 for laser beam modulation, is constituted by an A.0. modulator.

The optical master disk exposure apparatus of a second example comprises a guide groove exposure control circuit including the modulating means 7 for laser beam modulation using an electro-optic crystal (E.O. modulator), the other elements being the same as in the preceding first example.

The optical master disk exposure method according to the invention, will now be described with reference to the drawings.

The pre-pit designation signal generator 3 shown in FIG. 3 generates a pre-pit designation signal C according to data of the data format.

The pre-pit region voltage generator 4 generates a pre-pit region voltage D, which has a magnitude corresponding to 70 to 75% of the groove reference voltage B and is supplied to the guide groove exposure voltage supplier 6, according to the pre-pit designation signal C.

The bias voltage generator 5 generates the bias voltage E and supplies it to the guide groove exposure voltage supplier 6, which has a magnitude corresponding to 80 to 90% of the groove reference voltage B, when no pre-pits are formed according to the pre-pit designation signal C.

The guide groove exposure voltage supplier 6 supplies the guide groove exposure voltage F, which is obtained by adding together the groove reference voltage B from the groove reference voltage generator 2, the pre-pit region voltage D from the pre-pit region voltage generator 4, and the bias voltage E from the bias voltage generator 5, to the modulating means 7 for guide groove exposure, thus providing three exposure levels.

Figure 5:
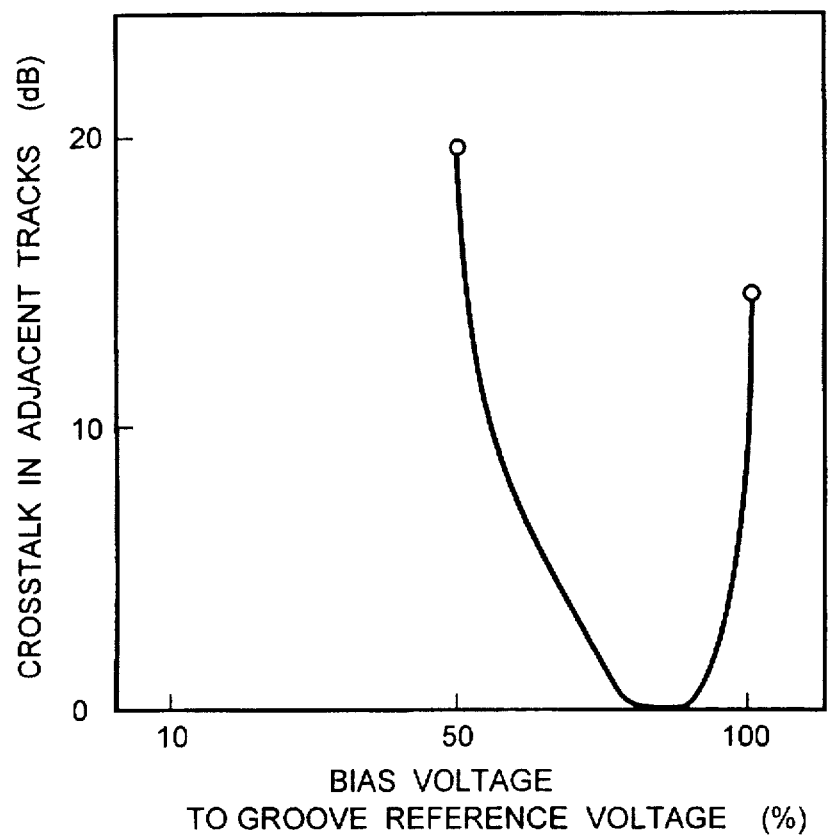
FIG. 5 is a graph showing a relation between the crosstalk by adjacent track pre-pits and the bias voltage E applied to optical disk medium manufactured in the embodiment of the optical master disk exposure method according to the invention.

FIG. 5 shows the relation between the cross-talk due to adjacent track pre-pits and the bias voltage applied to optical disk medium produced in the embodiment of the optical master disk exposure method according to the invention.

As shown in FIG. 5, with the optical disk medium made in this embodiment, it is possible to reduce cross-talk compared to that in the prior art optical disk medium by setting the bias voltage to 80 to 90% of the groove reference voltage and the pre-pit region voltage to 70 to 75% of the groove reference voltage.

In the second embodiment of the optical master disk exposure apparatus according to the invention, like the first embodiment, the bias voltage generator 5 generates a bias voltage E corresponding to 80 to 90% of the groove reference voltage B to be supplied to the guide groove exposure voltage supplier 6 when no pre-pit is formed according to the pre-pit designation signal C.

The guide groove exposure voltage supplier 6 supplies a guide groove exposure voltage F, which is obtained by adding together the groove reference voltage B from the groove reference voltage generator 2, the pre-pit region voltage D from the pre-pit region voltage generator 4, and the bias voltage E from the bias voltage generator 5, to the modulating means 7 for guide groove exposure, thus providing three different exposure power levels. The same effects as those shown in FIG. 5 thus can be obtained.

It is thought that the reduction of cross-talk due to pre-pits is attributable to the shape of guide grooves adjacent to pre-pits.

Figure 6:
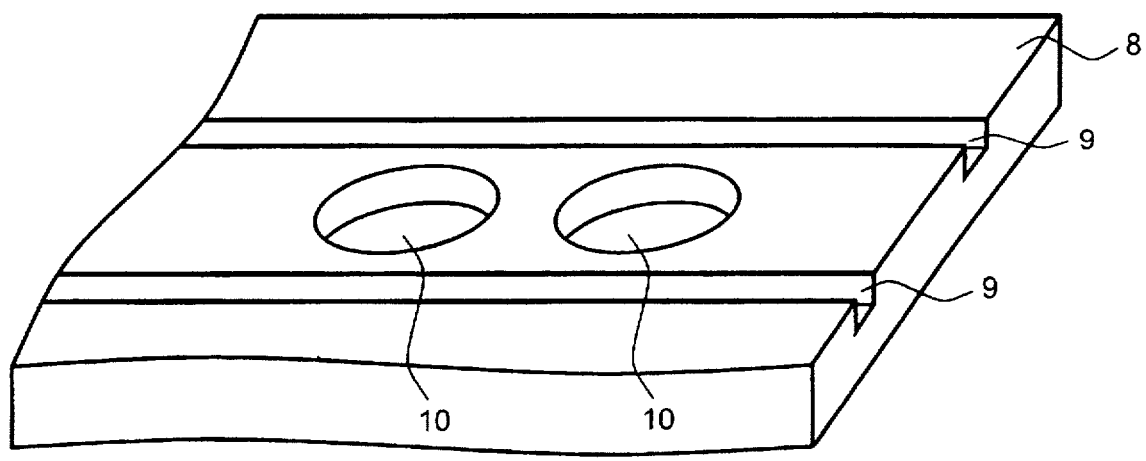
FIG. 6 is a view showing a model of the shape of guide grooves adjacent to pre-pits and grooves of an optical disk stamper produced in the embodiment of the optical master disk exposure method.

Specifically, as shown in FIG. 6, when the guide grooves 9 adjacent to pre-pits 10 are made uniform in shape over the entire disk surface, the laser beam that irradiates a track adjacent to the pre-pit during playback passes through the land center, thus alleviating or obviating the effects of pre-pits present in the land portion of the adjacent track 8.

FIG. 6 shows a model of the shape of guide grooves 9 adjacent to pre-pits 10 in an optical disk stamper manufactured in this embodiment of the optical master disk exposure method.

In this embodiment, the cross-talk was measured using an optical disk head with a wavelength of 680 nm.

To determine the cross-talk, the signal corresponding to signal leakage from pre-pits in two adjacent continuous tracks was obtained as a difference of the signal from the proper pre-pit signal detected by the optical head.

As has been described in the foregoing, in the apparatus for optical master disk exposure according to the invention, by using an optical master disk exposure apparatus which comprises a reference signal generator for generating a reference signal designating a region constituted by sole guide grooves without any pre-pit adjacent thereto, a groove reference voltage generator for generating a predetermined groove reference voltage according to the reference signal, a pre-pit designation signal generator for generating a pre-pit designation signal designating pre-pit formation, a pre-pit region voltage generator for generating a pre-pit region voltage corresponding to 70 to 75% of the groove reference voltage according to the pre-pit designation signal, a bias voltage generator for generating a bias voltage corresponding to 80 to 90% of the groove reference voltage in the case of forming no pre-pit according to the pre-pit designation signal, and a guide groove exposure voltage supplier for adding together the groove reference voltage, the pre-pit region voltage and the bias voltage and supplying the resultant sum voltage to the modulating means for modulating a guide groove exposure laser beam, it is made possible for guide grooves to be uniform over the disk surface, that is, guide grooves adjacent to pre-pits and those not adjacent to pre-pits can be made uniform, thus reducing cross-talk, i.e., leakage of pre-pit signal to adjacent tracks.

With the apparatus for and method of optical master disk exposure according to the invention, the reduction of cross-talk to the adjacent tracks permits improving the quality of recorded data signal.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An apparatus for optical master disk exposure for exposing guide grooves and pre-pits with laser beams, comprising:

a reference signal generator for generating a reference signal designating a region constituted by sole guide grooves with the pre-pits not adjacent thereto;

a groove reference voltage generator for generating a groove reference voltage according to said reference signal;

a pre-pit designation signal generator for generating a pre-pit designation signal designating formation of said pre-pits;

a pre-pit region voltage generator for generating a pre-pit region voltage according to said pre-pit designation signal;

a bias voltage generator for generating a bias voltage during a period in which no pre-pit is formed according to said pre-pit designation signal; and a guide groove exposure voltage supplier for adding together said groove reference voltage, said pre-pit region voltage and said bias voltage, and outputting a guide groove exposure voltage; and a laser beam modulating means for modulating said laser beams according to said guide groove exposure voltage received from said guide groove exposure voltage supplier.

2. An apparatus for optical master disk exposure according to claim 1, in which said guide groove exposure voltage supplier supplies said guide groove exposure voltage to said laser beam modulating means such that said laser beams exposing the guide grooves is power-modulated to at least three different output power levels.

3. An apparatus for optical master disk exposure according to claim 2, in which said guide groove exposure voltage supplier supplies said guide groove exposure voltage, obtained by adding together said groove reference voltage from said groove reference voltage generator, said pre-pit region voltage from said pre-pit region voltage generator, and said bias voltage from said bias voltage generator, to said laser beam modulating means so as to output three different exposure power levels.

4. An apparatus for optical master disk exposure according to claim 1, in which said laser beam modulating means is a modulator using an acousto-optic element (A. O. modulator).

5. An apparatus for optical master disk exposure according to claim 1, in which said laser beam modulating means is a modulator using an electro-optic crystal (E. O. modulator).

6. An apparatus for optical master disk exposure according to claim 2, in which said three different output power levels provided by power modulation of laser beams in said guide groove exposure voltage supplier are a first power level for exposing guide grooves adjacent to a region sandwiched between two pre-pits adjacent to each other in the circumferential direction in a pre-pit region of a common sector, a second power level for exposing the guide grooves adjacent to the pre-pits, and a third power level for exposing guide grooves outside the pre-pit region.

7. An apparatus for optical master disk exposure according to claim 6, in which said first and second power levels are respectively 80 to 90% and 70 to 75% of said third power level for exposing the guide grooves outside the pre-pit region.

* * * * *